March 15, 1938. M. KADENACY 2,110,986
EXHAUST DEVICE FOR EXPLOSION OR INTERNAL COMBUSTION ENGINES
Filed Aug. 1, 1934 4 Sheets-Sheet 1

M. Kadenacy
INVENTOR

By Glascock Downing Seebold
Attys.

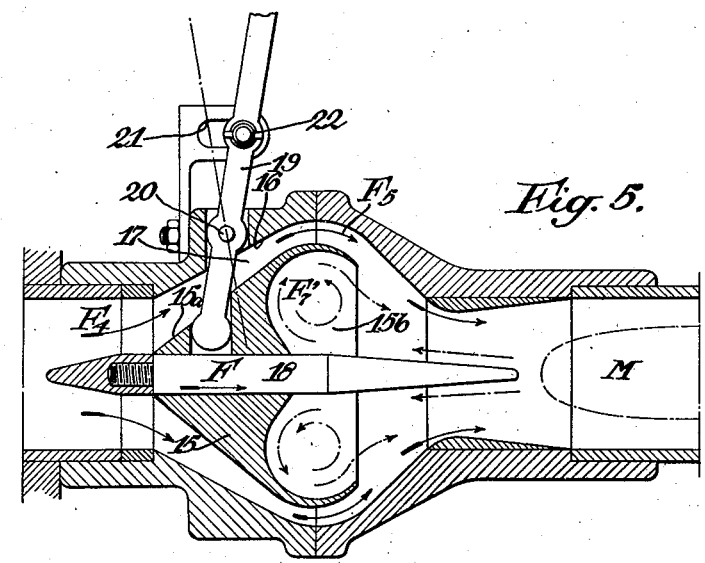
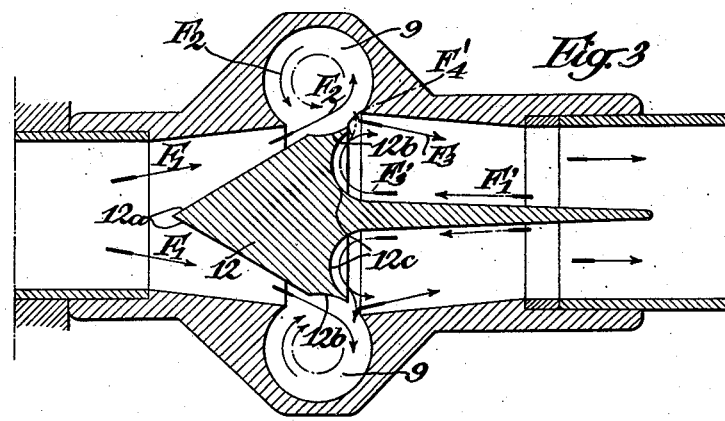
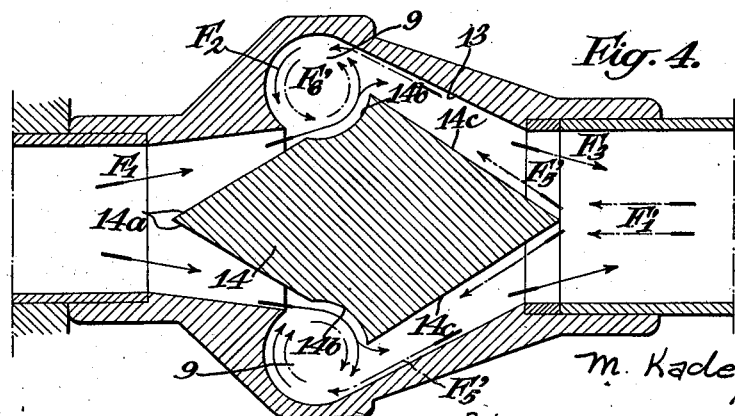

March 15, 1938. M. KADENACY 2,110,986
EXHAUST DEVICE FOR EXPLOSION OR INTERNAL COMBUSTION ENGINES
Filed Aug. 1, 1934  4 Sheets-Sheet 4

M. Kadenacy
INVENTOR

Glascock Downing Seebold
Attys.

Patented Mar. 15, 1938

2,110,986

UNITED STATES PATENT OFFICE 2,110,986

EXHAUST DEVICE FOR EXPLOSION OR INTERNAL COMBUSTION ENGINES

Michel Kadenacy, Paris, France

Application August 1, 1934, Serial No. 738,016
In France August 1, 1933

7 Claims. (Cl. 60—32)

The applicant has found that in an internal combustion engine, the behaviour of the gases is such as to lead to the conclusion that as a consequence of the combustion of the charge, and while still in the cylinder, the burnt gases form a mass having a high initial velocity and possessing properties similar to those of a resilient body, so that when the exhaust orifice opens this mass seeks to project itself bodily from the cylinder and to leave the latter in a consequent vacuous condition.

The present invention relates to two-stroke cycle internal combustion engines, wherein at least a substantial portion of the burnt gases leaves the cylinder at a speed much higher than that obtaining when an adiabatic flow only is involved and in such a short interval of time that it is discharged as a mass leaving a depression behind it which is utilized in introducing a fresh charge into the cylinder.

The applicant has also found that in the operation of such an internal combustion engine the burnt gases do not leave the cylinder immediately the exhaust orifice commences to open. There is first a period of delay, during which the burnt gases do not issue from the cylinder and after this delay has elapsed the burnt gases issue bodily from the cylinder with an extremely high velocity as a mass which responds to the laws of reflection and rebound and it leaves in the cylinder a profound depression. Subsequently, this outward motion of the burnt gases is reversed in direction and if the gases are allowed to re-enter the cylinder they destroy the depression left therein.

In Patent Number 2,102,559 dated December 14, 1937, the applicant has described and claimed a method of charging two-stroke cycle internal combustion engines which consists in opening the inlet orifice for the introduction of a fresh charge after the exhaust orifice opens, but only with the required delay to ensure that the burnt gases are then moving outwardly through the exhaust system as a consequence of their mass exit from the cylinder and cause a suction effect to be exerted in the cylinder at the said inlet orifice.

In such an engine, an untimely return of the burnt gases may have an objectionable influence on the contents of the cylinder and the object of the present invention is to provide in the exhaust system of an engine operating in accordance with the above method, means which are adapted to permit the free exit of the mass of burnt gases from the cylinder and to prevent the return of this mass or a portion thereof of burnt gases to the cylinder by utilizing the above mentioned properties of the burnt gases.

The invention consists in the provision within the exhaust system of deflecting means situated between the exhaust orifice and the point in the exhaust system from which the return of the burnt gases occurs after the said bodily exit from the cylinder at high velocity, the said deflecting means being adapted to permit the free outflow of the burnt gases and to prevent by reflection the return of the said gases to the cylinder.

It is to be understood that in considering the free outflow of the burnt gases losses due to friction are excepted, but these losses should of course be kept down to a minimum.

Now if the characteristics of the exhaust system are fixed, the interval elapsing between the bodily exit of the burnt gases from the cylinder and the subsequent reversal in direction of movement of these gases is a duration of time which is substantially constant. As a consequence, this interval will extend over a larger crank angle at high engine speeds than at low engine speeds. Consequently the return of the burnt gases is more liable to exert an objectionable influence on the contents of the cylinder at low engine speeds. If the angular separation between exhaust opening and inlet opening is also fixed, there will be a limiting low speed for which the return occurs too soon to permit the timing of inlet opening to be operative in the required manner.

In general, therefore, the means according to the invention will have the effect of improving the operation of the engine at low engine speeds and of extending the possible range of working speeds of the engine in the direction of low speeds.

Preferably the said deflecting surfaces will be situated close to the cylinder since the point where the body of gases issuing from the cylinder rebounds on the external gaseous medium is itself situated very near the exhaust orifice of the cylinder, and it is indispensable to place the device according to the invention between this exhaust orifice and said rebounding point in order that the obturation should be effected according to the method described.

The invention further provides an arrangement applicable in particular to engines for which very low speeds must be obtained relatively to their normal working speed.

In fact, in this case, the quantity of exhaust gases and their speed have very low values relatively to those corresponding to normal working conditions.

It is then difficult to form and maintain an obturating plug in the conditions above set forth, and this so much the more as, if the distribution gear is adjusted for producing, between the opening of the exhaust and that of the inlet for the following admission, a retardation corresponding to a definite fraction of the cycle, the duration of this retardation is reversely proportional to the speed of the engine; it results therefrom that the plug, already less important and less stable, as just stated, should however be able to "hold" a longer time for allowing the charging of the cylinder to take place.

A first means provided by the invention for avoiding this inconvenience consists in the combination, with the above walls, of a valve or other equivalent device, the operation of which is satisfactory at very low working speeds.

Moreover, even if, at the beginning of the exhaust, this valve does not close with the desired rapidity, the formation of the plug by the body of gases gives time for this closing to take place, whereupon, even if the plug is prematurely destroyed, the valve remains closed and maintains the obturation during a sufficient time.

The invention further provides another means which consists in suitably modifying the distribution gear, and particularly, the lapse of time between the exhaust and admission, in order that the period of time during which the obturating plug must "hold" should be, at low speed, reduced in the required proportions.

Such a device can be constructed in any suitable manner, for instance, by means of a sleeve or other adjustable obturator co-operating with the distribution ports, of a mechanism allowing to modify the angular position of the cams or other parts controlling the valve gear, etc.

This device can be controlled either by hand, or automatically, for instance, by the variations of speed of the engine, or by the operation of the device controlling the admission of fuel (throttle valve of the carburettor, injection pump) etc.

Use can also be made, for running in the exceptional working conditions obtained during starting and until the engine has acquired sufficient speed, of the means described in the above mentioned patent application, and which consists in blowing air into the cylinder.

In the accompanying drawings, Figures 1 to 11 illustrate various forms of carrying out the subject-matter of the invention, which will be described hereinafter by way of example only.

In these drawings:

Figure 3 shows a modified form of exhaust device.

Figure 4 shows another modified form of exhaust device.

Figure 5 shows a further modified form of exhaust device provided with adjusting means.

Figure 1:
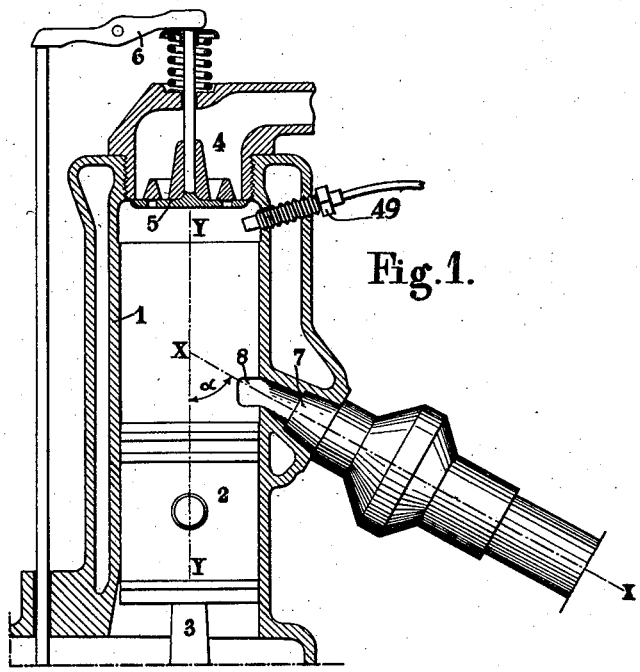
Figure 1 is a diagrammatic view of an engine cylinder, provided with an exhaust device according to the invention.

In these figures, the arrows indicate the displacement of the gases during their to-and-fro or whirling movement at a high speed utilized for the production of the obturating plug; the arrows in full lines correspond to the forward movement, and the arrows in dot and dash lines correspond to the return movement after rebounding.

By way of example, it is assumed that this device is applied to an engine having a cylinder 1, in which slides a piston 2 actuating the crank shaft through the medium of a connecting rod 3. 4 designates the inlet conduit, and 5 the inlet valve controlled for instance by a push-rod and rocker arm 6.

7 designates the exhaust conduit opening in the cylinder through one or more ports 8 uncovered by the piston 2 when it comes near its lower dead centre.

This engine can be of the explosion type in which case it will be fed through the conduit 4 with carburetted mixture, or of the combustion type, in which case it will be fed with air only through the conduit 4 and with fuel through an injector 49.

According to the invention, on the exhaust conduit 7 are arranged walls adapted to trap and guide, in the conditions set forth, the mass formed by the exhaust gases, whilst it has a movement at high speed, before it returns to the cylinder 1.

A first feature of this device resides in the fact that the axis X X of the exhaust conduit is preferably set downwardly, that is to say it forms, with the axis Y Y of the cylinder, a relatively acute angle $\alpha$. More generally, the exhaust conduit is set relatively to the cylinder, in order to impart a change of direction as small as possible to the body of gases, that is to say to check the same to the least possible extent.

Figure 2:
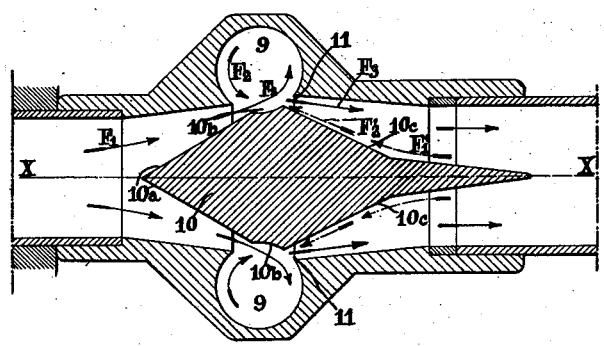
Figure 2 is a sectional view of the exhaust device shown in Figure 1.

According to Figures 1, 2, the inner wall of the conduit 7 forms a toroidal cavity 9, opposite which is arranged a deflector 10 according to the axis X X.

This deflector has a conical portion 10a, the apex of which faces the cylinder 1, and said deflector is so set as to guide the gases, when they issue from the cylinder, towards the torus 9, according to $F_1$.

The gases, trapped and guided by the inner wall of the torus, as well as by a portion 10b of the deflector 10 which completes this torus, whirl according to $F_2$ and form an obturating plug.

When the whirling movement comes to an end, the gases issue to the exterior through a free space 11 existing between the deflector 10 and the edge of the torus 9.

A portion of the gases can also pass directly through this space 11 without being trapped by the torus 9, and, according to the path indicated at $F_3$, rebounds as above set forth and returns according to $F'_1$. It then encounters the deflector 10, the down side end of which is formed, as indicated at 10c, for sending it into the torus 9 according to $F'_2$.

This fraction of the gases then encounters the plug formed at $F_2$ and is prevented from returning to the cylinder.

By the time the whirling movement of the plug has come to an end, all the gases contained in the conduit form a column which rapidly escapes, as stated.

Figure 3 illustrates a modification comprising, in the wall of the exhaust conduit, a torus 9 similar to that of the form of construction previously described, and opposite this torus, a deflector 12 constituting two walls 12a, 12b, which also guide the gases according to $F_1$—$F_2$.

The difference relatively to the preceding form of construction resides in the fact that the down side end of the deflector is shaped, at 12c, as a portion of a torus, so as to trap the gases which may have passed the torus 9 according to $F_3$ and have rebounded according to $F'_1$, and to cause them to form a second plug $F''_3$, or again to send them, according to $F''_4$, tangentially to the first plug so that they reinforce the same instead of running the risk of destroying it, as in the first embodiment in which they are radially admitted.

In the modification illustrated in Figure 4 the torus 9 formed by the inner wall of the exhaust conduit, terminates, on the down side, in a conical incline 13.

The deflector 14 has, on the up side, two parts 14a—14b which deflect the gases in the direction $F_1$—$F_2$, so as to form a whirling plug as described. On the down side, it has a part 14c parallel, or nearly parallel, to the wall 13.

In these conditions, the fraction of the gases which has escaped according to $F_3$ and has rebounded according to $F'_1$ is guided, between both walls 14c—13, according to $F'_5$, so as to tangentially enter the torus 9 and to form an eddy $F''_6$ which is added to the eddy $F_2$ and reinforces the obturating plug.

In the preceding embodiments, the obturating plug is formed by the totality or a portion of the gases during their forward movement. Devices will be described hereinafter in which the walls according to the invention are arranged for allowing the entire body of gases to freely pass during its forward movement, and to trap it and form the obturating plug during its return movement.

The form of construction illustrated in Figure 5 comprises a deflector 15, arranged in a bulged portion 16 of the exhaust conduit and so shaped as to present to the gases, on the up side, a smooth and continuous surface 15a of conical shape, terminating in a convex portion, in the shape of a fraction of a torus, and, on the down side, a cavity or recess 15b also in the shape of a torus.

When they issue from the cylinder, the gases enter the space 17 existing between the walls 15a and 16, and, these walls having a smooth and continuous shape, the movement and the peculiar properties of the gases are not subjected to any perturbation. These gases escape at a high speed according to $F_4$—$F_5$, they rebound on the atmosphere, and return, also at a high speed, in the form of a resilient body such as indicated at M. This body M is trapped by the recess 15b, in which it forms an obturating plug by whirling according to $F''_7$.

The following arrangement has also been provided in this apparatus:—

When the working speed of the engine increases, it is advantageous to provide for the gases issuing from the cylinder a passageway of larger cross section, in order to avoid checking these gases, the volume of which, and probably also the speed, are more important. Reversely, when the working speed diminishes, it is advantageous to always maintain the same conditions of operation by reducing the section of the passageway, and by adjusting the walls of the device in such a manner that they always trap the body of gases, upon its return, in the same conditions.

For that purpose, in the embodiment shown in Figure 5, the deflector 15 is slidably mounted on a support 18 arranged according to the axis of the exhaust conduit, in such a manner that it can be moved in the direction of the arrow F for diminishing the section of the passageway 17 and moving the recess 15b towards the mass or body M when the working speed of the engine diminishes, or reversely, when this working speed increases.

This sliding movement is controlled from the exterior by a lever 19 pivoted about a fixed stud 20; this lever can itself be actuated by hand, and, eventually, it can be held stationary in any position, for instance by means of a slotted frame 21 and of a clamping screw 22.

Figure 6:
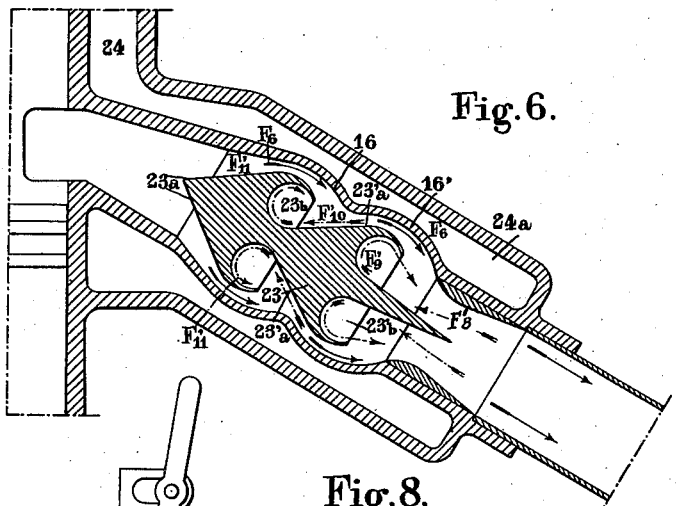
Figure 6 shows a further modified form of exhaust device provided with cooling means.

Figure 6 illustrates a form of construction of the same type as the preceding one, in which the deflector 23 comprises two elements arranged in series and each forming, on the up side, a smooth and continuous wall 23a, 23'a for allowing the gases to freely escape during the forward movement according to $F_6$ and, on the down side, a recess 23b, 23'b in the shape of a torus.

Both these elements are respectively located opposite two bulged portions 16, 16' of the exhaust conduit.

The body of gases, when it returns towards the cylinder according to $F'_8$, is trapped by the down side recess 23'b and forms, by whirling according to $F''_9$, an obturating plug; if a portion of this return wave passes beyond the recess 23'b, according to $F'_{10}$, it is trapped by the up side recess 23b which compels it to form, by whirling according to $F''_{11}$, another plug, so that it is possible, by means of these stepped recesses, to prevent in all cases any return of the gases to the cylinder.

It is easy, if need be, to cool the walls of this device, in any suitable manner according to Figure 6, for instance, the water jacket 24 for cooling the cylinder extends, at 24a, about the exhaust conduit.

Figure 7:
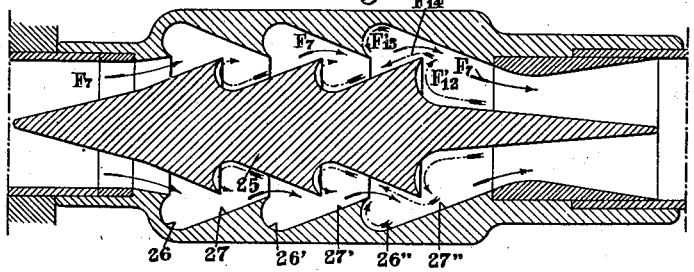
Figure 7 shows a further modified form of exhaust device provided with adjusting means.

Use can of course be made, according to circumstances, of deflectors having any number of elements in series. According to Figure 7, for instance, the deflector 25 comprises three of these elements.

Moreover, the inner wall also forms, towards the down side, cavities or recesses adapted to trap the gases which may have passed beyond those of the deflector.

These recesses are indicated in the drawings, at 26, 26', 26'', respectively opposite each of the elements of the deflector, and they terminate in smooth and continuous walls 27, 27', 27'' adapted to allow the gases to freely flow on their forward movement, according to $F_7$.

Upon their return movement, the gases are trapped in particular by the down side recess of the deflector 25, according to $F'_{12}$; another portion is trapped by the down side recess 26'' of the exhaust conduit, according to $F'_{13}$; the portion of the return wave which has succeeded in passing beyond both these recesses is trapped by the following recesses of the deflector and exhaust conduit.

This combination of both series of deflectors provides, under a very reduced volume, six cavities or recesses ensuring a very high efficiency of the device.

Figure 8:
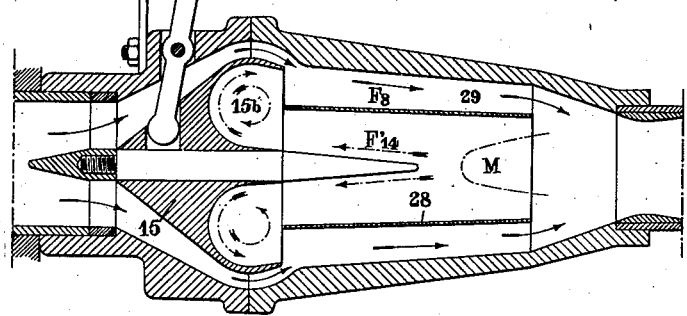
Figure 8 shows an exhaust device of multiple form.

Figure 8 illustrates a device of the same type as that shown in Figure 5, and in which the following improvement has been made; on the down side of the deflector 15, a sleeve 28 is arranged within the exhaust conduit and is concentric with the latter.

Upon their forward movement, the gases are guided according to $F_8$ in the annular space 29 existing between this sleeve and the exhaust conduit. Upon its return movement, the body of gases M enters this sleeve and is guided by the same, according to $F''_{14}$, towards the cavity or recess 15b which thus traps it in better conditions.

Another advantage of this device consists in that, when a fraction only of the body of gases has rebounded on the external atmosphere, whilst the other fraction has not yet rebounded, both these fractions are separated by the sleeve 28, and, instead of rubbing against each other, they respectively rub on the outer and inner smooth walls of this sleeve.

The checking effect exerted on the gas is thus considerably reduced, and this so much the more as the speed of each of the two fractions of gases relatively to the sleeve is half the speed they have relative to each other.

Figure 9:
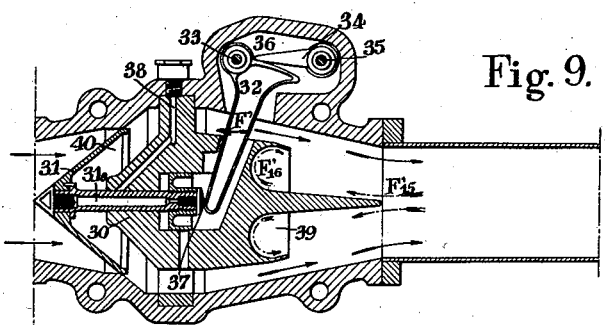
Figure 9 shows a form of exhaust device combined with a non-return valve for use at low engine speeds.
Figure 10:
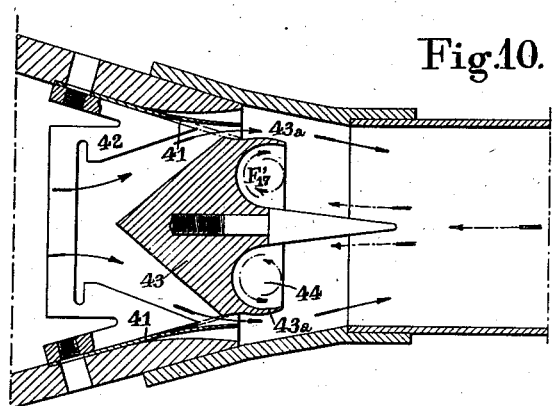
Figure 10 shows a similar arrangement to Figure 9 with a different form of nonreturn valve.
Figure 11:
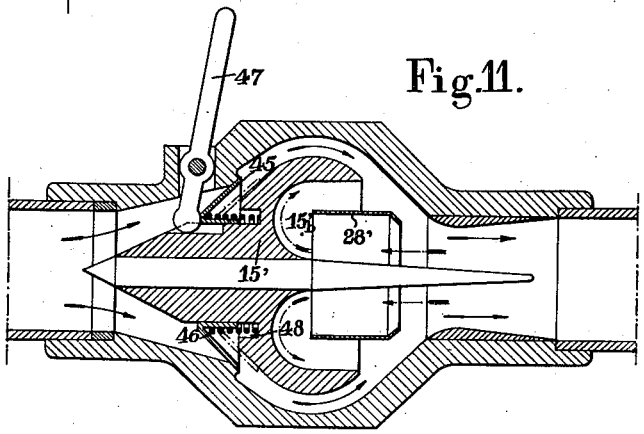
Figure 11 shows another form of exhaust device in combination with a nonreturn valve and means for putting the said valve out of action at normal running speeds.

Figures 9 to 11 illustrate devices comprising the combination of deflectors adapted to trap the bodies of gases and of obturating valves, which combination is mainly applicable to engines which are to reach very low speeds, as previously explained.

According to Figure 9, a support 30 is mounted in the exhaust conduit and is perforated, towards the up side, with an axial channel in which slides the tail 31a of an automatic obturating valve 31. This valve 31 is urged towards its closing position by a lever 32 pivotally mounted on a fixed stud 33, and urged in opposite direction to the arrow F'' by a tappet 34 pivotally mounted on a stud 35 and controlled by any suitable returning spring.

The studs 33, 35, as well as the returning spring, are arranged in a casing 36 placed outside the exhaust conduit.

The end of the lever 32 bears on an adjustable push piece 37 constituting the end of the valve tail piece 31a.

The lubrication of this valve tail piece is ensured by a lubricator 38.

On the other hand, the support 30 forms, on the down side, a cavity or recess 39 which traps the return wave, returning according to $F''_{15}$, and guides it so as to form a plug according to $F''_{16}$.

This obturation, ensured by the combined action of the recess 39 and valve 31, can be further improved by the use of a valve so arranged as to constitute a wall which traps and suitably guides the body of gases. In the example under consideration, the valve 31 is in the shape of a cone flared towards the down side, and constitutes a cavity or recess 40 which can trap and stop the body of gases, even if the valve is not yet reclosed. It is moreover to be noted that the action of the body of gases on the bottom of this recess 40 tends, on the other hand, to accelerate the closing movement of the valve.

According to Figure 10, the valve is constituted by very light resilient blades 41, clamped, at one end, between the inner wall of the exhaust conduit and a fixed support 42.

In closed position the free ends of these blades press upon a bearing portion 43a of an axial deflector 43.

This deflector 43 forms, on the other hand, on the down side, a recess 44, in the shape of a torus, adapted to trap and guide, according to $F''_{17}$, the body of gases during its return movement.

Finally, Figure 11 illustrates, in combination with a deflector 15' and a sleeve 28', of the same type as those shown in Figure 8, a check valve 45 longitudinally sliding on the deflector 15' and urged towards its closing position by a returning spring 46.

This valve 45 in combination with the toric recess 15'b formed on the down stream side of the deflector 15' ensures the obturation of the exhaust duct at low working speeds.

At normal working speed, the obturation is ensured solely by the body of gases suitably trapped and guided, the valve 45 being maintained out of action, in the position indicated in dot and dash lines, by a push piece 47.

In this position, the returning spring 46 is enclosed in a closed recess 48 and is not subjected to the action of the gases.

In the above examples, one cylinder only has been particularly considered, but any suitable arrangements can of course be provided for rendering the invention applicable to a multi-cylinder engine.

I claim:

1. In an internal combustion engine having a cylinder, a piston moving in this cylinder and connected to a crank shaft and inlet and exhaust orifices on the cylinder for introducing a combustible mixture and discharging the products of combustion respectively, and wherein for recharging the cylinder the exhaust gases are allowed to leave the cylinder substantially in their entirety and the fresh charge is allowed to enter the cylinder in the interval occurring between the above-mentioned exit of the burnt gases and the subsequent return movement of the burnt gases, an exhaust conduit leading from said exhaust orifice, a body within said exhaust conduit at a zone located nearer the exhaust orifice than the point of return of the burnt gases, and means for supporting said body concentrically with respect to said exhaust conduit, said body having a toroidal cavity directed away from the engine cylinder and having a progressively decreasing configuration in the direction of said cylinder, whereby a free outflow is provided for the burnt gases but their return to the cylinder is hindered by the formation in and by said toroidal cavity of a whirling gaseous plug consisting of at least a portion of the returning burnt gases.

2. In an internal combustion engine having a cylinder, a piston moving in this cylinder and connected to a crank shaft and inlet and exhaust orifices on the cylinder for introducing a combustible mixture and discharging the products of combustion respectively, and wherein for recharging the cylinder the exhaust gases are allowed to leave the cylinder substantially in their entirety and the fresh charge is allowed to enter the cylinder in the interval occurring between the above-mentioned exit of the burnt gases and the subsequent return movement of the burnt gases, an exhaust conduit leading from said exhaust orifice, a body located within said exhaust conduit in spaced relation with respect to the inner wall thereof and at a zone nearer the exhaust orifice than the point of return of the burnt gases, and means for supporting said body coaxially with respect to said exhaust conduit, said body having the form of a cone with its apex directed towards the cylinder and having a toroidal cavity in its base whereby a free outflow is provided for the burnt gases but their return to the cylinder is hindered by the formation in and by said toroidal cavity of a whirling gaseous plug consisting of at least a portion of the returning burnt gases.

3. In an internal combustion engine having a cylinder, a piston moving in this cylinder and connected to a crank shaft and inlet and exhaust orifices on the cylinder for introducing a combustible mixture and discharging the products of combustion respectively, and wherein for recharging the cylinder the exhaust gases are allowed to leave the cylinder substantially in their entirety and the fresh charge is allowed to enter the cylinder in the interval occurring between the above-mentioned exit of the burnt gases and the subsequent return movement of the burnt gases, an exhaust conduit leading from said exhaust orifice, said exhaust conduit having at a zone located nearer the exhaust orifice than the point of return of the burnt gases, an intermediate portion of greater internal cross-sectional area than the cross-sectional area at the cylinder, a body located within said intermediate portion, and means for supporting said body coaxially with respect to said exhaust conduit, said body having the form of a cone with its apex directed towards the cylinder and having a toroidal cavity in its base whereby a free outflow is provided for the burnt gases but their return to the cylinder is hindered by the formation in and by said toroidal cavity of a whirling gaseous plug consisting of at least a portion of the returning burnt gases.

4. In an internal combustion engine having a cylinder, a piston moving in this cylinder and connected to a crank shaft and inlet and exhaust orifices on the cylinder for introducing a combustible mixture and discharging the products of combustion respectively, and wherein for recharging the cylinder the exhaust gases are allowed to leave the cylinder substantially in their entirety and the fresh charge is allowed to enter the cylinder in the interval occurring between the above-mentioned exit of the burnt gases and the subsequent return movement of the burnt gases, an exhaust conduit leading from said exhaust orifice, a body located within said exhaust conduit in spaced relation with respect to the inner wall thereof and at a zone nearer the exhaust orifice than the point of return of the burnt gases, means for supporting said body coaxially with respect to said exhaust conduit with freedom for axial movement, said body having the form of a cone with its apex directed towards the cylinder and having a toroidal cavity in its base whereby a free outflow is provided for the burnt gases but their return to the cylinder is hindered by the formation in and by said toroidal cavity of a whirling gaseous plug consisting of at least a portion of the returning burnt gases and means for axially displacing said body within said exhaust conduit whereby the section of passage between said body and the inner wall of the exhaust conduit may be varied.

5. In an internal combustion engine having a cylinder, a piston moving in this cylinder and connected to a crank shaft and inlet and exhaust orifices on the cylinder for introducing a combustible mixture and discharging the products of combustion respectively, and wherein for recharging the cylinder the exhaust gases are allowed to leave the cylinder substantially in their entirety and the fresh charge is allowed to enter the cylinder in the interval occurring between the above-mentioned exit of the burnt gases and the subsequent return movement of the burnt gases, an exhaust conduit leading from said exhaust orifice, a body within said exhaust conduit at a zone located nearer the exhaust orifice than the point of return of the burnt gases, means for supporting said body concentrically with respect to said exhaust conduit, said body having a toroidal cavity directed away from the engine cylinder and having a progressively decreasing configuration in the direction of said cylinder, whereby a free outflow is provided for the burnt gases but their return to the cylinder is hindered by the formation in and by said toroidal cavity of a whirling gaseous plug consisting of at least a portion of the returning burnt gases, a sleeve located within said exhaust conduit immediately beyond said body and means for supporting said sleeve concentrically with respect to said exhaust conduit whereby the burnt gases during their outflow pass between the exhaust conduit and the sleeve and on their return pass within said sleeve to said toroidal cavity.

6. In an internal combustion engine having a cylinder, a piston moving in this cylinder and connected to a crank shaft and inlet and exhaust orifices on the cylinder for introducing a combustible mixture and discharging the products of combustion respectively, and wherein for recharging the cylinder the exhaust gases are allowed to leave the cylinder substantially in their entirety and the fresh charge is allowed to enter the cylinder in the interval occurring between the above-mentioned exit of the burnt gases and the subsequent return movement of the burnt gases, an exhaust conduit leading from said exhaust orifice, a body within said exhaust conduit at a zone located nearer the exhaust orifice than the point of return of the burnt gases, means for supporting said body concentrically with respect to said exhaust conduit, said body having a toroidal cavity directed away from the engine cylinder and having a progressively decreasing configuration in the direction of said cylinder, whereby a free outflow is provided for the burnt gases but their return to the cylinder is hindered by the formation in and by said toroidal cavity of a whirling gaseous plug consisting of at least a portion of the returning burnt gases and an automatic valve located in said exhaust conduit nearer the cylinder than said toroidal cavity and adapted to open and allow the burnt gases to pass beyond said body and to reclose and prevent the return of the burnt gases to the engine cylinder.

7. The combination as claimed in claim 6 including means for maintaining said automatic valve open except at low engine speeds.

MICHEL KADENACY.